United States Patent
Maltese

(10) Patent No.: US 11,361,533 B2
(45) Date of Patent: Jun. 14, 2022

(54) METHOD FOR DETECTING OBJECTS

(71) Applicant: SAFRAN ELECTRONICS & DEFENSE, Paris (FR)

(72) Inventor: Dominique Maltese, Paris (FR)

(73) Assignee: SAFRAN ELECTRONICS & DEFENSE, Paris (FR)

( * ) Notice: Subject to any disclaimer, the term of this patent is extended or adjusted under 35 U.S.C. 154(b) by 0 days.

(21) Appl. No.: 17/434,590

(22) PCT Filed: Apr. 21, 2020

(86) PCT No.: PCT/EP2020/061096
§ 371 (c)(1),
(2) Date: Aug. 27, 2021

(87) PCT Pub. No.: WO2020/216747
PCT Pub. Date: Oct. 29, 2020

(65) Prior Publication Data
US 2022/0148288 A1  May 12, 2022

(30) Foreign Application Priority Data

Apr. 24, 2019  (FR) ...................................... 1904287

(51) Int. Cl.
*G06K 9/00* (2022.01)
*G06V 10/75* (2022.01)
(Continued)

(52) U.S. Cl.
CPC ............ *G06V 10/758* (2022.01); *G01S 7/414* (2013.01); *G01S 13/04* (2013.01); *G01S 17/04* (2020.01);
(Continued)

(58) Field of Classification Search
CPC ........ G06V 10/22; G06V 10/23; G06V 10/25; G06V 10/255; G06V 10/26; G06V 10/36;
(Continued)

(56) References Cited

U.S. PATENT DOCUMENTS 6,333,993 B1 * 12/2001 Sakamoto ................. G06T 7/11
382/173
9,600,894 B2 * 3/2017 Ariga ................... G06V 10/255
(Continued)

OTHER PUBLICATIONS

Jun. 29, 2020 International Search Report issued in International Patent Application No. PCT/EP2020/061096.
(Continued)

*Primary Examiner* — Eric Rush
(74) *Attorney, Agent, or Firm* — Oliff PLC; R. Brian Drozd

(57) ABSTRACT

Detecting an object in an image of pixels is disclosed. The method includes: obtaining a position of a mask covering at least one pixel of an image; obtaining a predefined neighbourhood of pixels around the mask and dividing this neighbourhood into zones; for each zone, calculating a mean and variance of values of the pixels of the zone; calculating, for each possible pair of zones, a difference between the zones; determining whether a background of the mask is multimode or monomode according to the differences; calculating a variance of the values of the neighbourhood pixels using a formula for calculating the variance dependent on the monomode or multimode type of the background; calculating a signal to noise ratio for the mask position using the variance of the values of the pixels of the neighbourhood obtained; and detecting an object when the signal to noise ratio is above a threshold.

4 Claims, 5 Drawing Sheets

(51) Int. Cl.
  *G06V 10/25* (2022.01)
  *G06T 7/77* (2017.01)
  *G01S 7/41* (2006.01)
  *G01S 13/04* (2006.01)
  *G06V 10/36* (2022.01)
  *G06V 10/22* (2022.01)
  *G06T 7/70* (2017.01)
  *G06V 10/26* (2022.01)
  *G01S 17/04* (2020.01)
  *G06V 10/44* (2022.01)

(52) U.S. Cl.
  CPC .......... *G06T 7/70* (2017.01); *G06T 7/77* (2017.01); *G06V 10/23* (2022.01); *G06V 10/25* (2022.01); *G06V 10/26* (2022.01); *G06V 10/36* (2022.01); *G06V 10/451* (2022.01); *G06V 10/751* (2022.01); *G06V 2201/07* (2022.01)

(58) Field of Classification Search
  CPC .... G06V 10/44; G06V 10/443; G06V 10/451; G06V 10/50; G06V 10/52; G06V 10/751; G06V 10/758; G06V 2201/07; G06T 7/11; G06T 7/194; G06T 7/70; G06T 7/77; G01S 7/411; G01S 7/414; G01S 13/04; G01S 13/06; G01S 13/5244; G01S 17/04; G01S 17/06
  USPC ....... 382/100, 103, 173, 181, 190, 195, 205, 382/216–218, 260, 282, 283, 291; 342/90, 93, 159, 160, 189; 348/135, 143, 348/161, 169–172
  See application file for complete search history.

(56) References Cited

U.S. PATENT DOCUMENTS

| | | | |
|---|---|---|---|
| 9,922,407 B2* | 3/2018 | Bousquet | G06V 20/13 |
| 10,600,200 B2* | 3/2020 | Roux | G06T 7/73 |
| 2011/0001823 A1* | 1/2011 | Dufour | G06V 10/28 |
| | | | 382/103 |

OTHER PUBLICATIONS

Diao et al; "Image Sequence Measures for Automatic Target Tracking;" Progress in Electromagnetics Research; vol. 130; pp. 447-472; Aug. 21, 2012.

Schmieder et al; "Detection Performance in Clutter with Variable Resolution;" IEEE Transactions on Aerospace and Electronics Systems, IEEE Service Center; vol. AES-10; No. 4; Jul. 1, 1983.

* cited by examiner

METHOD FOR DETECTING OBJECTS

TECHNICAL FIELD

The invention relates to a method for detecting an object in an image and a device implementing said method.

PRIOR ART

Methods using object detection are normally used for monitoring the environment, in particular in air and sea fields. These methods consist in entering at least one optronic image of the environment and, in each image, seeking indicators of a presence of a potential object.

Known methods for detecting an object in an image consist in calculating local signal to noise (SNR) values and then comparing each local SNR value with a predefined detection threshold. An object is considered to be detected when a local SNR value is above the detection threshold.

FIG. 1 illustrates an implementation of such a method on the image 1 consisting of a grid of pixels. The image 1 comprises two objects O1 and O2. To detect whether at least one object is present in the image 1, the image is travelled over by a mask A. A mask is a set of pixels contained in a subpart of predefined form of the image being analysed. The set of pixels of the mask comprises one or a plurality of pixels. For each possible position of the mask in the image 1, a mean value $I_A$ of the values of the pixels included in the mask A (for example a value of a pixel is a grey-level value of said pixel), a mean value $I_B$ and a value of variance $\sigma_B^2$ of the values of the pixels in a neighbourhood B around the mask A are calculated. When the mask comprises a plurality of pixels, for reasons of calculation load, the mean $I_A$ may just as well be replaced by the value of a centre pixel of the mask A. A predefined neighbourhood of a mask is a set of pixels contained in a subpart of the image being analysed of predefined form located in proximity to said mask. From these three values, for each possible position of the mask, an SNR value is calculated as follows:

$$SNR = \frac{(I_A - I_B)}{\sigma_B}$$

Here typically positive-contrast object detection is spoken of, i.e. it is necessary for the value of $I_A$ to be higher than that of $I_B$ for a detection test to be able to be applied. An SNR value may also be calculated as follows:

$$SNR = \frac{|I_A - I_B|}{\sigma_B}$$

Here typically positive or negative contrast object detection is spoken of, i.e. the sign of the difference between the mean value $I_A$ and the mean value $I_B$ is of little importance.

The SNR value obtained is next compared with the detection threshold in order to determine the presence or not of an object. When the SNR value exceeds the detection threshold, a detection, referred to as initial detection, is declared. When the mask comprises a single pixel, the pixel constitutes the initial detection. When the mask comprises a plurality of pixels, the centre pixel of the mask constitutes the initial detection. Labelling is next performed in order to attempt to group together initial detections. One objective of the labelling is to group together initial detections corresponding to the same object. The grouping is performed in accordance with position proximity criteria (typically implemented with a connectiveness of "4" or "8"). A grouping of initial detections constitutes a detection also referred to as a plot.

Furthermore, it is known that an object may move in a variable environment. A known problem occurs when, on a given image, the object is located on a textured background, such as a multimode background comprising at least two different textures.

FIGS. 2A, 2B and 2C show an image acquired by an optronic device such as a camera (not shown) wherein an aircraft 1 is moving in an environment comprising a cloud 2. During its movement in this environment, the aircraft 1 passes successively from a cloudless zone to a cloudy zone, and then returns to a cloudless zone. The aircraft 1 is potentially an object able to be detected by an object-detection method.

In the images shown by FIGS. 2A and 2B, the pixels corresponding to the aircraft 1 have characteristics (brightness values, grey-level values, SNR values, etc.) very different from the pixels in the vicinity of the aircraft 1. It is considered here, to simplify, that the cloud is an almost uniform zone. An object corresponding to the aircraft 1 is then detected without difficulty in these images, for example by the method using the mask A described above. This is because, in this case, when the mask A is positioned in the aircraft 1, the SNR value obtained is above the detection threshold.

FIG. 2C describes a less favourable situation. In the image corresponding to FIG. 2C, the aircraft 1 is situated partly on a background corresponding to the cloud 2 and partly on a background corresponding to the sky. In this case, when the mask A is positioned on the aircraft 1, the value of the variance $\sigma_B^2$ is high, which has the effect of decreasing the SNR value obtained. The SNR value may then pass below the detection threshold. FIG. 2C therefore represents a typical case of non-detection of an object when the object is located on a multimode background.

It is desirable to overcome these drawbacks of the prior art. It is in particular desirable to propose a method that makes it possible to detect an object, whether the object be located on a monomode background or on a multimode background. It is moreover desirable to propose a method that is simple to implement and which has a low calculation cost.

DISCLOSURE OF THE INVENTION

According to a first aspect of the present invention, the present invention relates to a method for detecting an object in an image of pixels, each pixel being represented by a pixel value, comprising: obtaining a position of a mask in said image, said mask covering at least one pixel of said image; obtaining a predefined neighbourhood of pixels around said mask and dividing this neighbourhood into a plurality of zones; calculating, for each possible pair of zones of said neighbourhood, a value representing a difference between said zones; if at least one of the values representing a difference is above a first predetermined threshold, determining that a background of the mask is of the multimode type, and otherwise determining that said background is of the monomode type; calculating a variance $\sigma_B^2$ using a first calculation formula when said background is of the monomode type and using a second calculation formula when said background is of the multimode type; calculating a signal to noise ratio for the position of the mask the noise of which is estimated by the variance $\sigma_B^2$ calculated; determining that an initial detection of an object has been made when said signal to noise ratio is above a second predetermined threshold; and applying a labelling to each initial detection to attempt to form at least initial detection grouping called a plot from neighbouring initial detections in accordance with a predefined criterion among said detections.

According to one embodiment, when the background of the mask is of the monomode type, the formula for calculating the variance $\sigma_B^2$ takes into account, for each zone, a difference between the mean of the values of the pixels of said zone and a mean of the values of the pixels of said neighbourhood, and takes into account the variance of the values of the pixels of each zone of the neighbourhood, and, when the background of the mask is of the multimode type, the formula for calculating the variance $\sigma_B^2$ takes into account only the variance of the values of the pixels of each zone of the neighbourhood.

According to a particular embodiment, the first calculation formula is as follows:

$$\sigma_B^2 = \frac{1}{N}\left(\sum_{i=1}^{N}(I_B^i - I_B)^2\right) + \frac{1}{N}\sum_{i=1}^{N}\sigma_B^{i2}$$

where N is the number of zones of the neighbourhood, $I_B^i$ is the mean of the values of the pixels of a zone of index i of the neighbourhood, $I_B$ is the mean of the values of the pixels of the neighbourhood, and $(\sigma_B^i)^2$ is the variance of the values of the pixels of the zone of index i of the neighbourhood, and the second calculation formula is as follows:

$$\sigma_B^2 = \frac{1}{N}\sum_{i=1}^{N}\sigma_B^{i2}$$

According to one embodiment, a value representing a difference between two zones is a value of a difference between each of the zones in accordance with a $\chi^2$ law:

$$\delta_{ij} = \frac{(I_B^i - I_B^j)^2}{\left((\sigma_B^i)^2 + (\sigma_B^j)^2\right)}$$

where $\delta_{ij}$ is a difference value between a zone of index i and a zone of index j, $I_B^i$ is a mean value of the values of the pixels of the zone of index i, $I_B^j$ is a mean value of the values of the pixels of the zone of index j, $(\sigma_B^i)^2$ is a variance of the values of the pixels of the zone of index i and $(\sigma_B^j)^2$ is a variance of the values of the pixels of the zone of index j.

According to a second aspect of the invention, the invention relates to a device for detecting an object in an image of pixels, each pixel being represented by a pixel value, comprising: obtaining means for obtaining a position of a mask in said image, said mask covering at least one pixel of said image; obtaining means for obtaining a predefined neighbourhood of pixels around said mask and for dividing this neighbourhood into a plurality of zones; calculation means for calculating, for each zone, a mean and a variance of the values of the pixels of said zone; calculation means for calculating, for each possible pair of zones of said neighbourhood, a value representing a difference between said zones; determination means for determining, if at least one of the values representing a difference is above a first predetermined threshold, that a background of the mask is of the multimode type, and otherwise for determining that the background of the mask is of the monomode type; calculation means for calculating a variance $\sigma_B^2$ using a first calculation formula when said background is of the monomode type and using a second calculation formula when said background is of the multimode type, said first calculation formula being the following:

$$\sigma_B^2 = \frac{1}{N}\left(\sum_{i=1}^{N}(I_B^i - I_B)^2\right) + \frac{1}{N}\sum_{i=1}^{N}\sigma_B^{i2}$$

where N is the number of zones of the neighbourhood, $I_B^i$ is the mean of the values of the pixels of a zone of index i of the neighbourhood, $I_B$ is the mean of the values of the pixels of the neighbourhood, and $(\sigma_B^i)^2$ is the variance of the values of the pixels of the zone of index i of the neighbourhood, and said second calculation formula is as follows:

$$\sigma_B^2 = \frac{1}{N}\sum_{i=1}^{N};$$

calculation means for calculating a signal to noise ratio for the position of the mask the noise of which is estimated by the calculated variance $\sigma_B^2$; detection means for determining that an initial detection of an object has been made when said signal to noise ratio is above a second predetermined threshold; and labelling means for applying a labelling to each initial detection to attempt to form at least one grouping of initial detections called a plot from neighbouring initial detections according to a predefined criterion among said initial detections.

According to a third aspect of the invention, the invention relates to a computer program comprising instructions for implementing, by a device, the method according to the first aspect, when said program is executed by a processor of said device.

According to a fourth aspect, the invention relates to storage means storing a computer program comprising instructions for executing, by a device, the method according to the first aspect, when said program is executed by a processor of said device.

BRIEF DESCRIPTION OF THE DRAWINGS

The features of the invention mentioned above, as well as others, will emerge more clearly from the reading of the following description of an example embodiment, said description being made in relation to the accompanying drawings, among which.

DETAILED DISCLOSURE OF EMBODIMENTS

The invention is described hereinafter in a context of aerial surveillance using an image acquisition device making acquisitions of images in a visible domain. The invention could just as well apply in different surveillance contexts such as maritime surveillance. Moreover, the invention applies to other types of image (i.e. other spectral domains) such as infrared images, thermal images and radar images.

Figure 1:
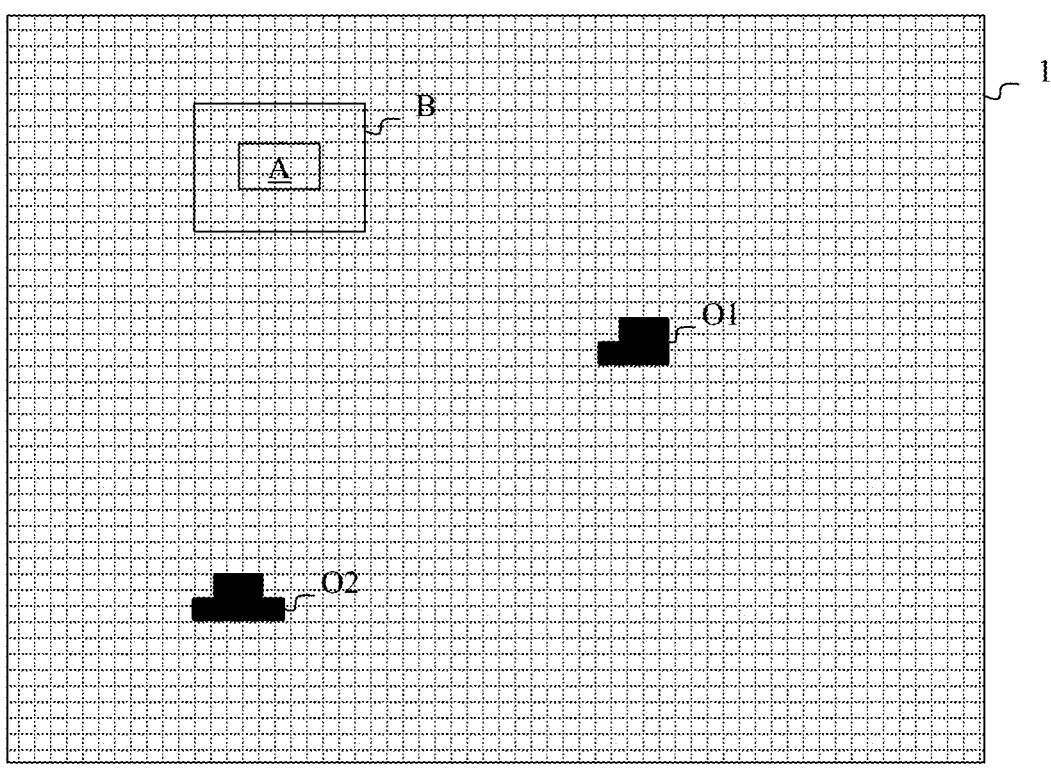
FIG. 1 illustrates a method for detecting an object in an image.
Figure 2A:
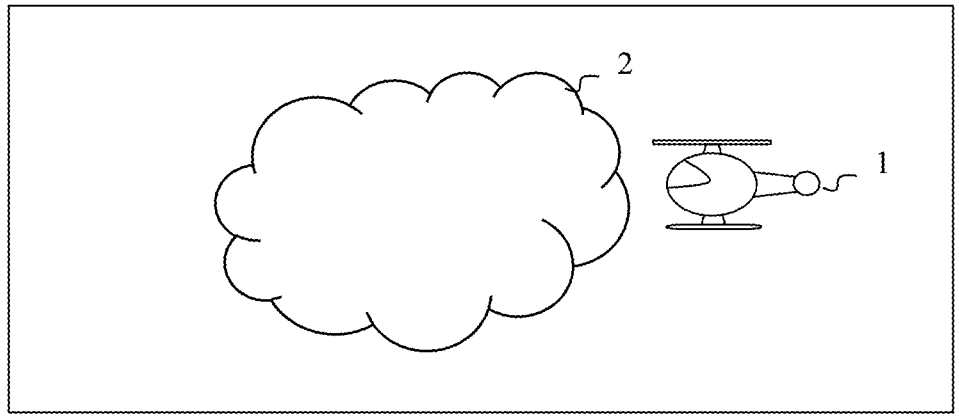
FIG. 2A illustrates schematically a first image acquired by an optronic device such as a camera (not shown) wherein an aircraft is moving in an environment comprising a cloud.
Figure 2B:
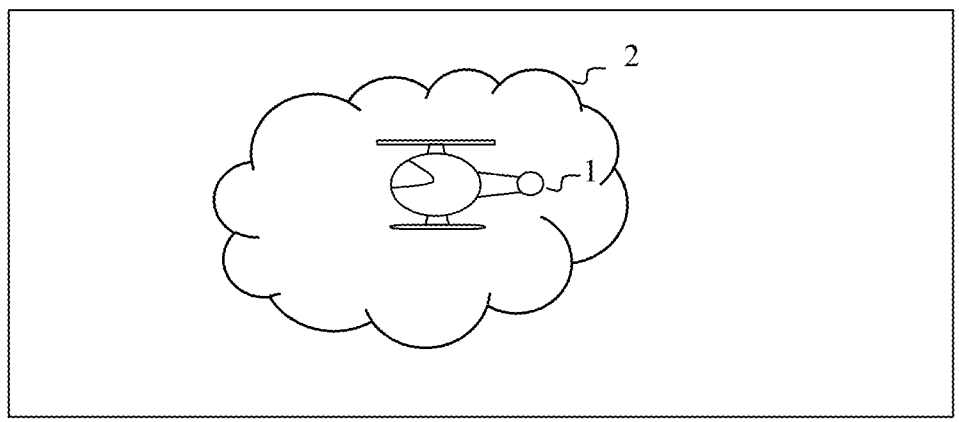
FIG. 2B illustrates schematically a second image of the aircraft acquired by the optronic device.
Figure 2C:
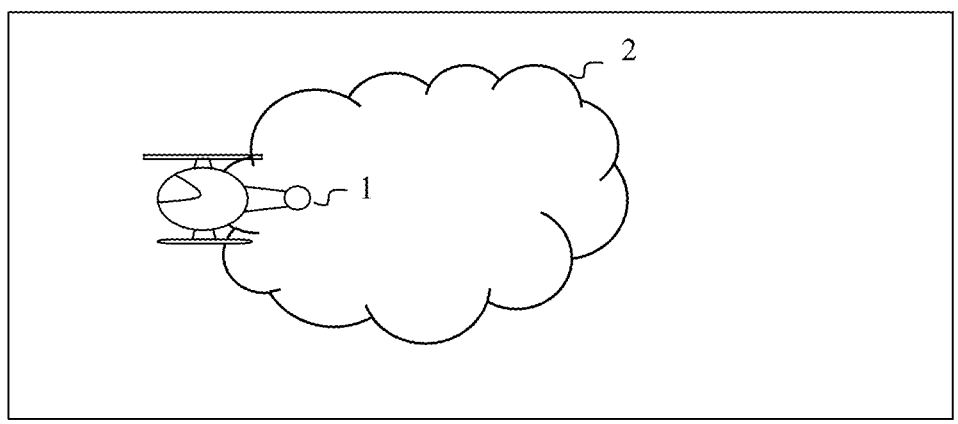
FIG. 2C illustrates schematically a third image of the aircraft acquired by the optronic device.
Figure 3A:
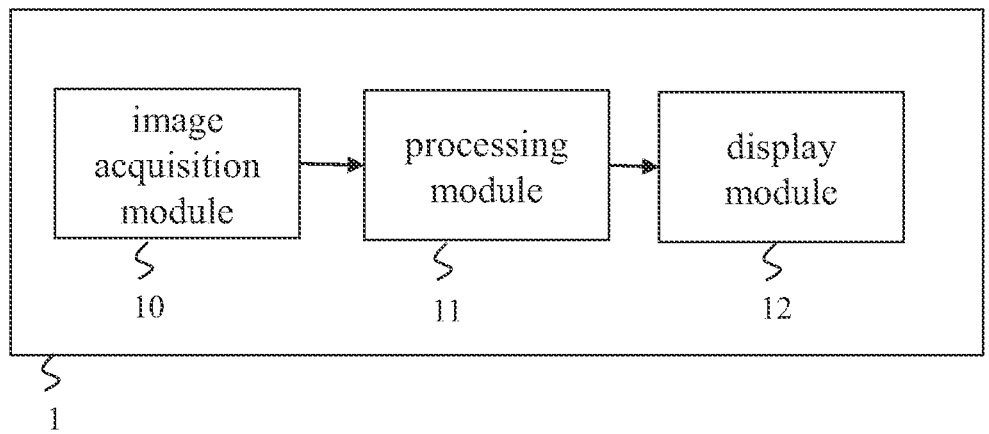
FIG. 3A illustrates schematically equipment suitable for implementing the invention.

FIG. 3A illustrates schematically equipment 1 suitable for implementing the invention.

The equipment 1 comprises an image acquisition module 10 such as a camera operating in the visible spectral domain. The image acquisition module 10 supplies the images that it has acquired to a processing module 11. The image processing module 11 is suitable, among other things, for detecting objects in each image according to the method of the invention described hereinafter in relation to FIG. 4.

The processing module 11 supplies information representing each object detected to a display module 12, such as a screen, which displays this information so that it can be used by an operator. For example, the processing module 11 supplies to the display module 12 information representing a position of each object detected in an image acquired. In another embodiment, the information representing each object detected supplied by the image processing module 11 can also be used as an input of a spatiotemporal filtering module called tracking, used for reducing a system false alarm (thermal noise, artefacts) while enhancing the detections (objects) of information representing an apparatus kinematics or behaviour of said detections.

It is considered that the equipment 1 forms an optronic system.

In FIG. 3A, the image acquisition module 10, processing module 11 and display module 12 are shown as forming part of one and the same item of equipment 1. In one embodiment, these modules could also be included in different items of equipment or devices each comprising a communication module enabling them to communicate with each other. These items of equipment or devices then form an optronic system suitable for implementing the invention.

Figure 3B:
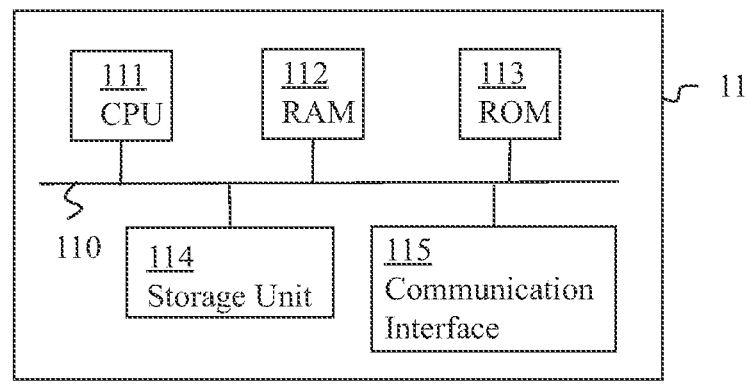
FIG. 3B illustrates schematically a hardware architecture of a processing module suitable for implementing the invention.

FIG. 3B illustrates schematically an example of a hardware architecture of the processing module.

According to the example of hardware architecture shown in FIG. 3B, the processing module 11 then comprises, connected by a communication bus 110: a processor or CPU (central processing unit) 111; a random access memory RAM 112; a read only memory ROM 113; a storage unit such as a hard disk or a storage medium reader, such as an SD (Secure Digital) card reader 114; at least one communication interface 115 enabling the processing module 11 to communicate with the image acquisition module 10 and the display module 12.

The processor 111 is capable of executing instructions loaded in the RAM 112 from the ROM 113, from an external memory (not shown), from a storage medium (such as an SD card), or from a communication network. When the equipment 1 is powered up, the processor 111 is capable of reading instructions from the RAM 112 and executing them. These instructions form a computer program causing the complete or partial execution, by the processor 111, of the method described hereinafter in relation to FIG. 4.

Figure 4:
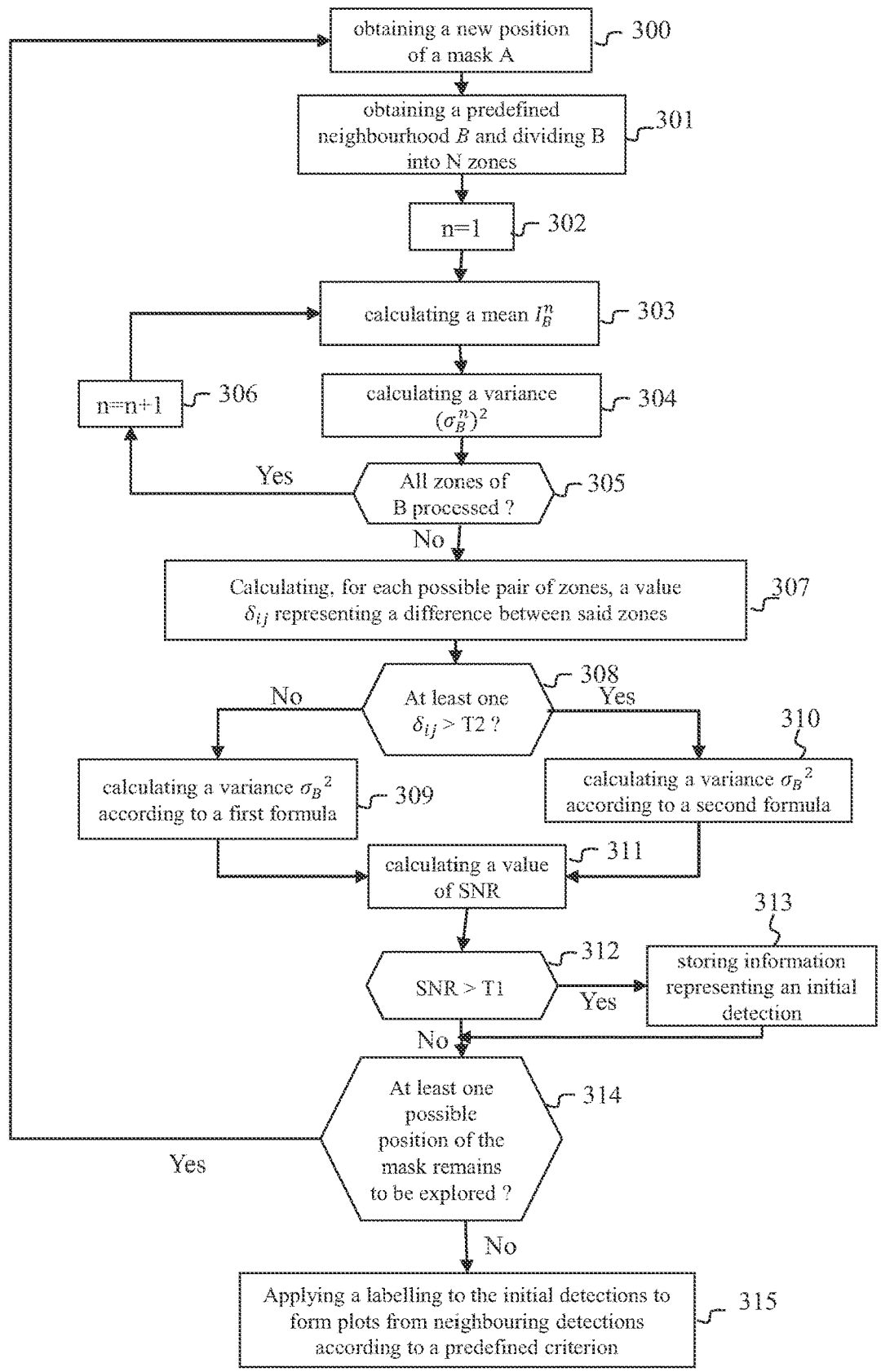
FIG. 4 illustrates schematically a method for detecting objects in an image according to the invention.

The method described in relation to FIG. 4 can be implemented in software form by executing a set of instructions by a programmable machine, for example a DSP (digital signal processor) or a microcontroller, or be implemented in hardware form by a machine or a dedicated component, for example an FPGA (field-programmable gate array) or an ASIC (application-specific integrated circuit).

FIG. 4 illustrates schematically a method for detecting objects in an image according to the invention.

The method is executed for each image acquired by the image acquisition module 10. An image being processed by the equipment 1 is hereinafter referred to as the current image. We suppose hereinafter that the image acquisition module 10 generates images where each pixel comprises a component, such as for example an image in grey levels.

A mask A is defined for travelling over the current image using a travel algorithm. In one embodiment, the mask A corresponding to a rectangle of pixels of the current image having a height over a vertical axis of the current image equal to a number V of pixels and a width over a horizontal axis of the current image equal to a number H of pixels.

An example of a travel algorithm consists of travelling over the current image with the mask A by horizontal lines. Each horizontal line corresponds to a band of pixels of the current image with a height equal to the number V and with a width equal to the width of the current image. The horizontal lines of the current image are travelled over for example from left to right, and from top to bottom. On a given horizontal line, at each iteration of the method described in relation to FIG. 4, the mask advances by one pixel.

In a step 300, the processing module 11 obtains a new position of the mask A. During the first iteration of the method of FIG. 4, the processing module 11 obtains a position of the mask A corresponding to the corner at top left of the current image.

In a step 301, the processing module 11 obtains a predefined neighbourhood B of pixels around the mask A, and divides this neighbourhood B into a number N of zones. Several neighbourhoods B and, for each neighbourhood, several divisions into N zones are possible.

Figure 5A:
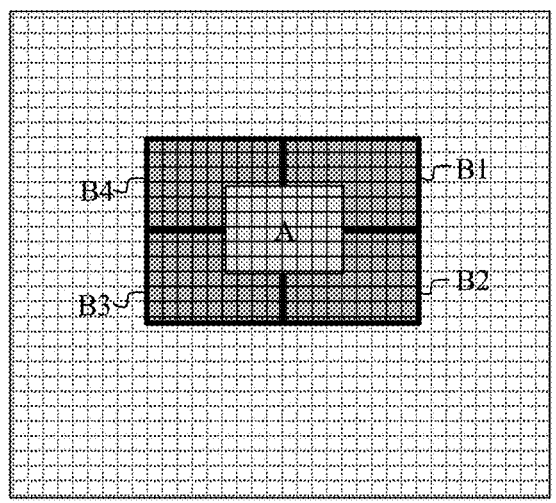
FIG. 5A illustrates schematically a first example of a neighbourhood B divided into four zones.

FIG. 5A illustrates schematically a first example of a neighbourhood B divided into four zones. In this example, the neighbourhood B forms a rectangular ring around the mask A.

Figure 5B:
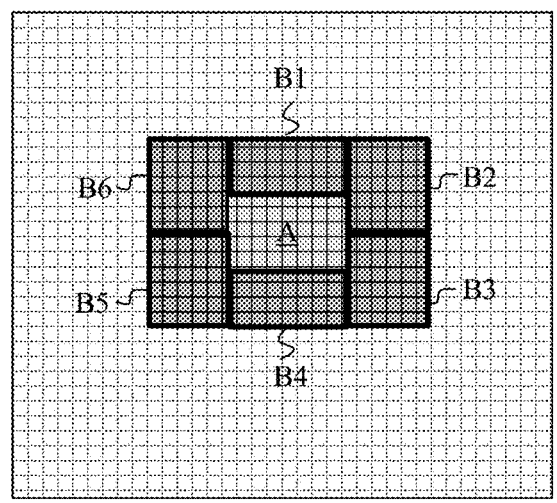
FIG. 5B illustrates schematically the first example of a neighbourhood B divided into six zones.

FIG. 5B illustrates schematically the first example of a neighbourhood B described in relation to FIG. 5A, but this time divided into six zones.

Figure 5C:
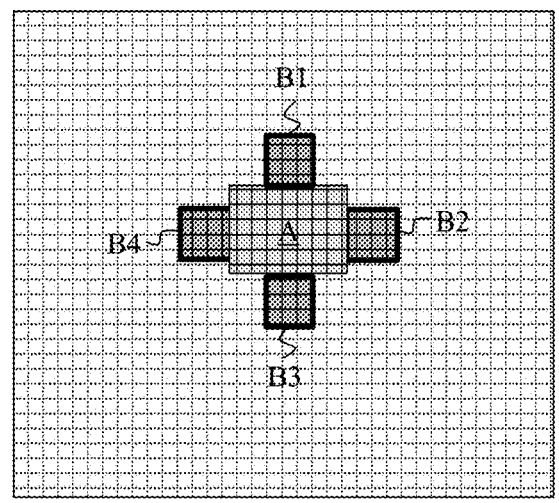
FIG. 5C illustrates schematically a second example of a neighbourhood B divided into four zones.

FIG. 5C illustrates schematically a second example of a neighbourhood B divided into four zones with identical shapes. In this example, the neighbourhood B comprises four separate parts distributed above, below, to the right of and to the left of the mask A, each part corresponding to a zone.

In a step 302, the processing module 11 initialises a variable n to 1, the variable n serving to travel over each zone of the neighbourhood B.

In a step 303, the processing module 11 calculates a mean $I_B^n$ of the values of the pixels of the zone number n of the neighbourhood B.

In a step 304, the processing module 11 calculates a variance $(\sigma_B^n)^2$ of the values of the pixels of the zone number n of the neighbourhood B.

In a step 305, the processing module 11 checks that all the zones of the neighbourhood B have been processed. To do this, if the variable n is less than or equal to N, the processing module 11 passes to a new zone of the neighbourhood B by incrementing the variable n by one unit in a step 306. The step 306 is then followed by the step 303.

When the variable n is equal to N+1, the step 305 is followed by a step 307.

In the step 307, the processing module 11 calculates, for each possible pair of zones of the neighbourhood B, a value representing a difference between said zones. In one embodiment, a value representing a difference between two zones is a difference value $\delta_{ij}$ ($i \neq j$, $i \in [1, N]$, $j \in [1, N]$) between each of the zones according to a $\chi^2$ law.

$$\delta_{ij} = \frac{(I_B^i - I_B^j)^2}{\left((\sigma_B^i)^2 + (\sigma_B^j)^2\right)}$$

Other values representing a difference could be envisaged, such as a sum of absolute difference (SAD) or a sum of squared difference (SSD) between the values of the pixels of the two zones, when the two compared zones have identical forms.

The module then obtains (N−1)(N/2) different difference values $\delta_{ij}$.

In a step 308, each of the (N−1)(N/2) difference values is compared with a predetermined threshold T2 in order to determine whether the background of the mask A is of the multimode or monomode type. The predetermined threshold T2 was determined from a plurality of training images comprising objects on monomode or multimode backgrounds. The predetermined threshold T2 was selected so as to automatically distinguish the objects on monomode backgrounds from objects on multimode backgrounds in the training images. If at least one of the difference values $\delta_{ij}$ is above the predetermined threshold T2, the processing module 11 determines that the background of the mask A is of the multimode type and performs a step 310. Otherwise the processing module 11 considers that the background of the mask A is of the monomode type and performs a step 309.

In the step 309, the processing module 11 calculates a variance $\sigma_B^2$ of the values of the pixels of the neighbourhood B according to an exact formula taking into account, for each zone, a difference between the mean $I_B^i$ of the values of the pixels of said zone and a mean $I_B$ of the values of the pixels of the neighbourhood B, and the variance $(\sigma_B^i)^2$ of the values of the pixels of each zone of the neighbourhood B.

$$\sigma_B^2 = \frac{1}{N}\left(\sum_{i=1}^{N}(I_B^i - I_B)^2\right) + \frac{1}{N}\sum_{i=1}^{N}\sigma_B^{i2}$$

During the step 310, the processing module 11 calculates a variance $\sigma_B^2$ according to a formula not taking into account the means $I_B^i$ and $I_B$, but only the variance $(\sigma_B^i)^2$ of the values of the pixels of each zone of the neighbourhood B. Thus the calculated variance $\sigma_B^2$ is equal to the mean of the variances $(\sigma_B^i)^2$.

$$\sigma_B^2 = \frac{1}{N}\sum_{i=1}^{N}\sigma_B^{i2}$$

The processing module 11 therefore adapts the calculation of the variance to the multimode or monomode type of the background of the mask A. The formula for calculating the variance $\sigma_B^2$ is in fact dependent on the monomode or multimode type of the background of the mask A.

In a step 311, the processing module 11 calculates the value of the SNR for the current position of the mask as follows:

$$SNR = \frac{|I_A - I_B|}{\sigma_B}$$

or as follows:

$$SNR = \frac{|I_A - I_B|}{\sigma_B}$$

Thus the value representing the variance $\sigma_B^2$ obtained at the step 309 or 310 is used for estimating the noise in the signal to noise ratio. More precisely, the noise is equal to the standard deviation $\sigma_B$.

Depending on whether it is wished to take into account only positive contrasts or positive and negative contrasts.

In one embodiment $I_A$ is the value of a centre pixel of the mask A.

If the value of the SNR is above a predetermined detection threshold T1, in a step 312 the processing module 11 considers that an object has been detected. The predetermined threshold T1 was determined from a plurality of training images comprising objects. The predetermined threshold T1 was selected so as to automatically distinguish the objects in the training images and to limit the number of false detections.

When a detection of an object, referred to as the initial detection, has been made, the processing module 11 forms a step 313 during which the processing module 11 stores information representing the initial detection. In one embodiment, the information representing the initial detection comprises coordinates in the current image of the initial detection.

In a step 314, the processing module 11 determines whether the entire current image has been travelled over with the mask A or whether other possible positions of the mask have not yet been explored. If at least one other position remains to be explored, the processing module 11 returns to the step 300. If the entire current image has been travelled over, the processing module 11 performs a step 315.

During the step 315, the processing module 11 applies a labelling to the initial detections made in the current image to attempt to form plots (i.e. groups of detections) from neighbouring detections according to a predefined criterion among said detections. The predefined criterion is for example a connectiveness 4 or 8. Following the labelling, information representing each plot is transmitted to the display module 12. The information representing each plot comprises for example the current image and a position of each plot.

In one embodiment, the processing module 11 supplies this information representing each plot to a tracking module for filtering the system false alarm and supplementing the information representing each plot with information representing an apparent kinematics or behaviour of said plot.

In another embodiment, the current image could be travelled over partially, for example by completely travelling over a version reduced by subsampling of the current image having a resolution lower than its initial resolution, and then travelling over the current image in its initial resolution only in the neighbourhood of any plots detected in the reduced version.

In one embodiment, each current image is a multicomponent image, i.e. each pixel comprises a plurality of components. In this case, in one embodiment, the method described in relation to FIG. 4 is applied independently to each component. An object is considered to be detected if, at a given position of the mask A, at least one SNR value calculated at the step 312 in a component is above the predetermined detection threshold T1.

In one embodiment, the mask A corresponds to a pixel.

In one embodiment, the method described in relation to FIG. 4 is repeated for a plurality of different masks A and/or for a plurality of different neighbourhoods B. An object is considered to be detected if, at a given position of a mask A, at least one SNR value calculated at the step 312 for one of the masks A in question and/or for one of the neighbourhoods B in question is above the predetermined detection threshold T1.

The invention claimed is:

1. A method for detecting an object in an image of pixels, each pixel being represented by a pixel value, comprising:
    obtaining a position of a mask in said image, said mask covering at least one pixel of said image;
    obtaining a predefined neighbourhood of pixels around said mask and dividing said neighbourhood into a plurality of zones;
    calculating, for each possible pair of zones of said plurality of zones of said neighbourhood, a value representing a difference between said pair of zones;
    if at least one of the values representing a difference is above a first predetermined threshold, determining that a background of the mask is of a multimode type, and otherwise determining that said background is of a monomode type;
    calculating a variance $\sigma_B^2$ using a first calculation formula when said background is of the monomode type and using a second calculation formula when said background is of the multimode type, said first calculation formula being as follows:

$$\sigma_B^2 = \frac{1}{N}\left(\sum_{i=1}^{N}(I_B^i - I_B)^2\right) + \frac{1}{N}\sum_{i=1}^{N}\sigma_B^{i2}$$

where N is the number of said plurality of zones of the neighbourhood, $I_B^i$ is a mean of the pixel values of the pixels of a zone of index i of the neighbourhood, $I_B$ is a mean of the pixel values of the pixels of the neighbourhood, and $(\sigma_B^i)^2$ is a variance of the pixel values of the pixels of the zone of index i of the neighbourhood, and said second calculation formula being as follows $$\sigma_B^2 = \frac{1}{N}\sum_{i=1}^{N}\sigma_B^{i2}$$

calculating a signal to noise ratio for the position of the mask, wherein the noise is estimated by the variance $\sigma_B^2$ calculated;
    determining that an initial detection of an object has been made when said signal to noise ratio is above a second predetermined threshold; and
    applying a labelling to each initial detection to attempt to form at least one grouping of initial detections called a plot from neighbouring initial detections according to a predefined criterion from said initial detections.

2. The method according to claim 1, wherein the value representing a difference between two zones is a difference value between each of the two zones according a $\chi^2$ law:

$$\delta_{ij} = \frac{(I_B^i - I_B^j)^2}{\left((\sigma_B^i)^2 + (\sigma_B^j)^2\right)}$$

where $\delta_{ij}$ is a difference value between the zone of index i and a zone of index j, $I_B^i$ is the mean value of the pixels values of the pixels of the zone of index i, $I_B^j$ is a mean value of the pixel values of the pixels of the zone of index j, $(\sigma_B^i)^2$ is the variance of the pixel values of the pixels of the zone of index i and $(\sigma_B^j)^2$ is a variance of the pixel values of the pixels of the zone of index j.

3. A non-transitory storage medium storing instructions for executing, by device, the method according to claim 1, when the instructions are executed by a processor of said device.

4. A device for detecting an object in an image of pixels, each pixel being represented by a pixel value, comprising at least one processor configured to:
    obtain a position of a mask in said image, said mask covering at least one pixel of said image;
    obtain a predefined neighbourhood of pixels around said mask and divide said neighbourhood into a plurality of zones;
    calculate, for each zone of the plurality of zones, a mean and a variance of the pixel values of the pixels of said zone;
    calculate, for each possible pair of zones of said plurality of zones of said neighbourhood, a value representing a difference between said pair of zones;
    determine, if at least one of the values representing a difference is above a first predetermined threshold, that a background of the mask is of a multimode type, and otherwise determine that said background is of a monomode type;
    calculate a variance $\sigma_B^2$ using a first calculation formula when said background is of the monomode type and using a second calculation formula when said background is of the multimode type, said first calculation formula being as follows:

$$\sigma_B^2 = \frac{1}{N}\left(\sum_{i=1}^{N}(I_B^i - I_B)^2\right) + \frac{1}{N}\sum_{i=1}^{N}\sigma_B^{i2}$$

where N is the number of said plurality of zones of the neighbourhood, $I_B^i$ is a mean of the pixel values of the pixels of a zone of index i of the neighbourhood, $I_B$ is a mean of the pixel values of the pixels of the neighbourhood, and $(\sigma_B^i)^2$ is a variance of the pixel values of the pixels of the zone of index i of the neighbourhood, and said second calculation formula being as follows:

$$\sigma_B^2 = \frac{1}{N}\sum_{i=1}^{N}\sigma_B^{i2}$$

calculate a signal to noise ratio, wherein the noise is estimated by the variance $\sigma_B^2$ calculated;

determine that an initial detection of an object has been made when said signal to noise ratio is above a second predetermined threshold; and apply a labelling to each initial detection to attempt to form at least one grouping of initial detections called a plot from neighbouring initial detections according to a predefined criterion from said initial detections.

* * * * *